(12) United States Patent
Dubugnon et al.

(10) Patent No.: US 11,940,379 B2
(45) Date of Patent: *Mar. 26, 2024

(54) DEVICE FOR MEASURING A RELATIVE HUMIDITY LEVEL INSIDE THE ENCLOSURE OF A WATCH CASE

(71) Applicant: The Swatch Group Research and Development Ltd, Marin (CH)

(72) Inventors: Dominique Dubugnon, Saint-Prex (CH); Cédric Blatter, Commugny (CH); Michel Willemin, Prêles (CH)

(73) Assignee: The Swatch Group Research and Development Ltd, Marin (CH)

( * ) Notice: Subject to any disclaimer, the term of this patent is extended or adjusted under 35 U.S.C. 154(b) by 352 days.

This patent is subject to a terminal disclaimer.

(21) Appl. No.: 17/480,250

(22) Filed: Sep. 21, 2021

(65) Prior Publication Data
US 2022/0120677 A1 Apr. 21, 2022

(30) Foreign Application Priority Data
Oct. 16, 2020 (EP) .................................... 20202329

(51) Int. Cl.
*G01M 3/38* (2006.01)
*G01N 21/3554* (2014.01)
*G04D 7/00* (2006.01)

(52) U.S. Cl.
CPC ......... *G01N 21/3554* (2013.01); *G04D 7/007* (2013.01)

(58) Field of Classification Search
CPC ...................................................... G01M 3/38
See application file for complete search history.

(56) References Cited

U.S. PATENT DOCUMENTS

| | | | | |
|---|---|---|---|---|
| 4,979,820 A | * | 12/1990 | Shakkottai | G01M 3/24 381/172 |
| 11,585,748 B2 | * | 2/2023 | Dubugnon | H04R 23/008 |
| 2016/0091415 A1 | * | 3/2016 | Furukawa | G01N 21/1702 356/72 |
| 2020/0026243 A1 | * | 1/2020 | Tortora | G04D 7/004 |

FOREIGN PATENT DOCUMENTS

| | | |
|---|---|---|
| CH | 708 924 A2 | 6/2015 |
| CN | 105629713 A | 6/2016 |
| EP | 1 388 766 A1 | 2/2004 |

(Continued)

OTHER PUBLICATIONS

European Search Report of European Patent Application No. 20 20 2329.7 dated Mar. 16, 2021.

*Primary Examiner* — Alexander A Mercado
(74) *Attorney, Agent, or Firm* — Sughrue Mion, PLLC

(57) ABSTRACT

A device (1) for measuring a relative humidity level inside the enclosure (9) of a case (3) of a watch (2), the device (1) including: an emitter module (5) provided with a source of light radiation capable of emitting light beams (8) towards the enclosure (9) of the case (3); a receiver module (6a, 6b, 6c) for receiving at least one acoustic signal (12) from the enclosure (9), and a control unit (7) connected to the modules (5, 6) and which is configured to evaluate the water vapour content of a gaseous fluid (11) contained inside the enclosure (9) as a function of the at least one acoustic signal (12) received by the receiver module (6a, 6b, 6c).

10 Claims, 1 Drawing Sheet

(56) References Cited

FOREIGN PATENT DOCUMENTS

| | | |
|---|---|---|
| EP | 3 598 246 A1 | 1/2020 |
| JP | 2000-193645 A | 7/2000 |
| JP | 2001-507798 A | 6/2001 |
| JP | 2008-542722 A | 11/2008 |
| JP | 2012-526973 A | 11/2012 |
| JP | 2020-12827 A | 1/2020 |
| WO | 98/29733 A1 | 7/1998 |
| WO | 2006/127833 A2 | 11/2006 |
| WO | 2010/145892 A1 | 12/2010 |

* cited by examiner

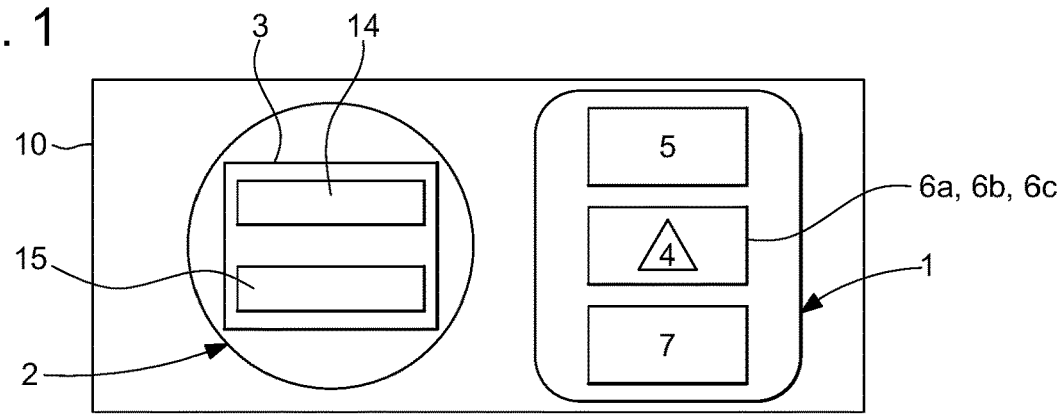
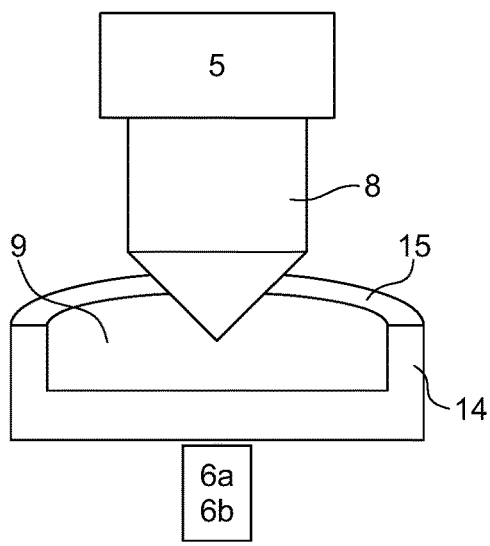
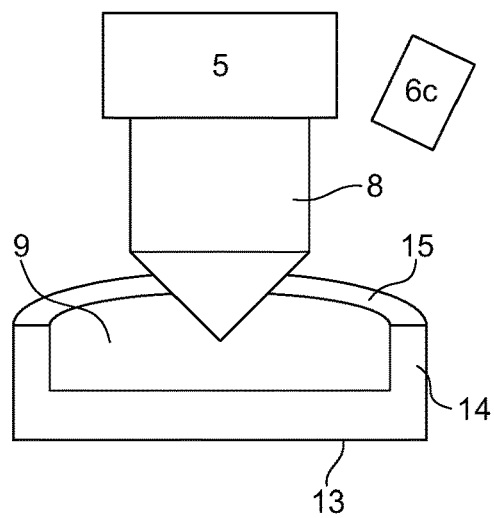
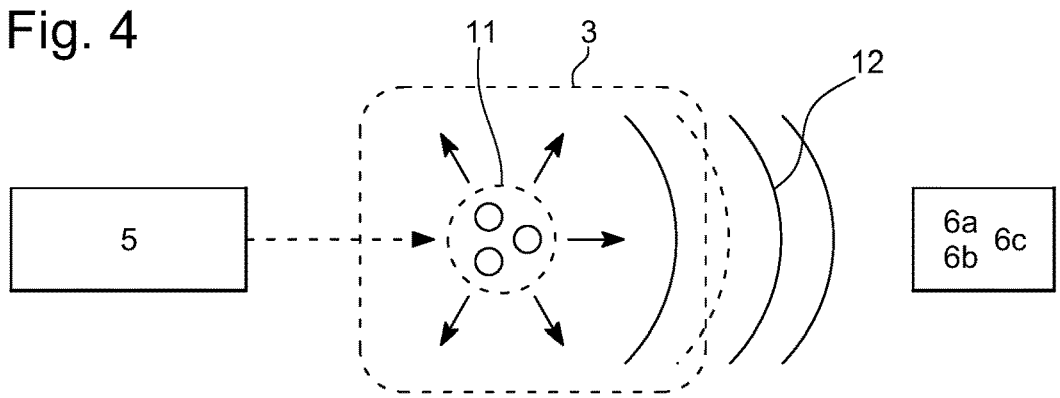

DEVICE FOR MEASURING A RELATIVE HUMIDITY LEVEL INSIDE THE ENCLOSURE OF A WATCH CASE

CROSS REFERENCE TO RELATED APPLICATIONS

This application is a claiming priority based on European Patent Application No. 20202329.7 filed on Oct. 16, 2020, the disclosure of which is incorporated herein in its entirely by reference.

TECHNICAL FIELD OF THE INVENTION

The invention relates to a device for measuring a relative humidity level inside the enclosure of a watch case.

The invention further relates to an assembly for determining a relative humidity level inside a watch comprising such a measuring device.

PRIOR ART

The water-resistance of a watch is measured in bars (a bar is a unit of pressure where 1 bar equals 1 atmosphere (atm)). The water-resistance of a watch is often indicated in metres (m). A watch that is described as water-resistant is intended for ordinary everyday use that must guarantee resistance to water, for example during activities such as swimming or simply in the shower. A so-called diving watch has to comply with stricter standards and, according to the current standard, guarantee water-resistance up to a minimum depth of 100 m.

To guarantee water-resistance, watches are usually provided with a set of watertight seals positioned in the assembly points of certain parts of the watch, such as the crystal, the bezel and the back of the watch, as well as of moving parts such as the crown and the push buttons. Over time and with use, the mechanical properties of the seals change and the water-resistance of the watch can sometimes deteriorate. This makes the watch more permeable to water or water vapour. This can result in condensation phenomena on the inside face of the watch crystal, or worse, in the oxidation of certain metal components or the degradation of certain polymer components. There is thus a need to be able to monitor the relative humidity level inside the watch from time to time without necessarily having to open it, since opening the watch case would require systematically replacing the seals and the intervention of a watchmaker, which is expensive. Excessive water vapour inside the watch can indicate that one or more seals need to be replaced in the short to medium term.

In order to meet this need, some watches are known to include a device for measuring the relative humidity level inside the watch. Such a measuring device takes the form of an electronic module capable of measuring and recording values of various environmental parameters, including relative humidity. Due to the small size of such an electronic module, it can be arranged inside a watch case and can measure, via a dedicated sensor, the relative humidity level inside the watch case. The measured relative humidity values can then be transmitted to a watch docking station wirelessly, typically by infrared or radio frequency means. The signal, which is for example an infrared signal, emitted by the electronic module thus passes through a transparent portion of the watch case, typically the crystal, and is received by an infrared sensor of the docking station. A user of the watch can then view the measured relative humidity values using a computer connected to the docking station and on which dedicated software has been installed, or using a smartphone.

However, one drawback of such an electronic measuring device is that it requires a battery or a cell to power the various electronic components. Such a device is thus relatively unsuitable for mechanical watches in particular. Moreover, for electronic watches, it can reduce the autonomy of a product or require the use of a larger capacity battery and thus increase the volume of the watch.

Another drawback is that such a device is relatively bulky and not very discreet inside the watch. Furthermore, such an electronic measuring device is relatively expensive and thus has repercussions on the manufacturing cost of the watch.

SUMMARY OF THE INVENTION

The purpose of the invention is thus to provide a device for measuring the relative humidity level present inside a watch case, contributing to detecting a defect in the water-resistance of such a case, by allowing the relative humidity level inside this case to be monitored without having to open it. Such a measuring device is cost-effective, easy to use and procures a reliable and fast measurement of the relative humidity level inside the watch case.

The invention relates to a device for measuring a relative humidity level inside the enclosure of a watch case, the device comprising:
  an emitter module provided with a source of light radiation capable of emitting light beams towards the enclosure of said case;
  a receiver module for receiving at least one acoustic signal from said enclosure; and
  a control unit connected to said modules and which is configured to evaluate the water vapour content of a gaseous fluid contained inside said enclosure as a function of said at least one acoustic signal received by the receiver module.

According to other embodiments:
  the emitter module comprises an element for modulating said source of light radiation configured such that said emitter module emits light beams capable of ensuring a generation of at least one acoustic signal by a gaseous fluid containing the water vapour contained in the enclosure of the case;
  the emitter module is capable of emitting short-pulse light beams;
  the receiver module comprises at least one electroacoustic transducer;
  the receiver module comprises a pressure microphone or a pressure-gradient microphone;
  the receiver module comprises an optical microphone;
  the optical microphone comprises a source of electromagnetic radiation, reflective elements such as mirrors, at least one detector for detecting this electromagnetic radiation and an interferometer;
  the control unit comprises, in the memory elements thereof, one or more look-up tables for matching values of acoustic signals with values of water vapour contents of a gaseous fluid contained inside said enclosure;
  the source of light radiation is a laser source and the gaseous fluid is air containing water vapour.

The invention further relates to an assembly for determining a relative humidity level inside a watch comprising said watch and such a measuring device.

BRIEF DESCRIPTION OF THE FIGURES

The purposes, advantages and features of this device for measuring a relative humidity level inside a watch will appear more clearly in the following description which is given on the basis of at least one non-limiting embodiment shown by way of the drawings, in which:

FIG. 1 is a diagrammatic view of an assembly for determining a relative humidity level inside a watch comprising a device for measuring the relative humidity level of this inside of the watch, according to one embodiment of the invention;

FIG. 2 is a diagrammatic view of a first alternative of the device for measuring the relative humidity level comprising a receiver module including a pressure microphone or a pressure-gradient microphone, according to the embodiment of the invention;

FIG. 3 is a diagrammatic view of a second alternative of the device for measuring the relative humidity level comprising a receiver module including an optical microphone, according to the embodiment of the invention; and FIG. 4 is a diagrammatic view of the method for operating the measuring device according to the embodiment of the invention.

DETAILED DESCRIPTION OF THE INVENTION

FIGS. 1 to 3 show the assembly 10 for measuring a relative humidity level inside a watch 2. This assembly 10 comprises a device 1 for measuring a relative humidity level inside the watch 2 as well as this watch 2. It should be noted that FIGS. 2 and 3 show two alternatives of this measuring device 1 which differ through the technology used in a receiver module 6a to 6c for receiving at least one acoustic signal 12, which will be described hereinbelow.

It should be noted that the "relative humidity level" is understood herein to mean the ratio between the partial pressure of the water vapour contained in the air and the saturation vapour pressure at the same temperature. In other words, the measurement of the relative humidity level corresponds to a measurement of the ratio of the water vapour content of the air to the maximum water vapour capacity thereof under the same temperature conditions.

It should be noted that the watch 2 can be a watch 2 of any type, such as a mechanical watch 2 or an electronic watch 2 for example.

In this configuration, the measuring device 1 comprises an emitter module 5 comprising a source of light radiation and which is capable of emitting light beams 8 towards the enclosure 9 of said case 3. The device 1 further comprises a receiver module 6a to 6c for receiving at least one acoustic signal 12 from said enclosure 9 and a control unit 7 connected to these two modules 5, 6.

In this emitter module 5, the source of light radiation is preferably a laser source. Alternatively, this source of light radiation can be an infrared light source. This emitter module 5 comprises an element 4 for modulating said source of light radiation configured to generate at least one acoustic signal 12 in said enclosure 9 of the case 3 under the effect of the light beams, in this case of the laser beams, emitted by the emitter module. In other words, said element 4 for modulating said source of light radiation is configured such that said emitter module 5 emits light beams capable of ensuring a generation of at least one acoustic signal 12 by the gaseous fluid 11 containing the water vapour contained in the enclosure 9 of the case 3.

More specifically, with reference to FIG. 4, the molecules of the gaseous fluid 11, in this case air containing in particular water vapour, which are present inside the enclosure 9 of the case 3, are excited to a higher electronic, vibrational or rotational quantum state by absorbing the electromagnetic radiation constituted by these modulated light beams emitted by the emitter module 5. In general, the depopulation of this quantum state to lower states occurs either by fluorescence or by collisions, the latter giving rise to an increase in the temperature of the gaseous fluid 11 due in particular to energy transfer processes. This non-radiative relaxation process occurs when the relaxation time can compete with the radiative lifetime of the excited energy levels. Thus, the modulator element 4 of the emitter module 5, by modulating the source of radiation, contributes to periodically varying the temperature of this gaseous fluid 11 present inside the enclosure 9 of the case 3, which gives rise to a periodic change in pressure in this enclosure 9, which leads to the generation of said at least one acoustic signal 12 inside this enclosure. It should be noted that the temperature can also modulate a refractive index, which can be detected optically.

Such an emitter module 5 is capable of emitting femtosecond and/or nanosecond laser pulses. Such femtosecond pulses can be generated from a visible or near-infrared laser and the nanosecond pulses can be produced from ultraviolet light. In particular, it should be noted that the emitter module 5 is capable of simultaneously or serially emitting a plurality of light beams at wavelengths having different absorption coefficients in the gaseous fluid 11 containing the water vapour. Moreover, it should be noted that this module is capable of emitting a YAG-type laser optically pumped by means of flash lamps or laser diodes, or even a dye laser.

It should be noted that the emitter module 5 can further comprise an optical parametric oscillator, also known by the acronym "OPO". This oscillator is a coherent, monochromatic light source that is preferably used to produce wavelengths where lasers cannot.

In this measuring device 1, the receiver module 6a to 6c for receiving said at least one acoustic signal 12 originating from said enclosure 9 comprises at least one electroacoustic transducer which is able to convert an acoustic signal 12 into an electrical signal. In a first alternative of the measuring device 1, such an emitter module 6a, 6b can comprise at least one pressure microphone 6a or pressure-gradient microphone 6c generally provided with a diaphragm or with a piezoelectric element which is capable of deforming and/or moving under the effect of an acoustic signal or wave. In a second alternative of the measuring device 1, this emitter module 6 can comprise at least one optical microphone 6c. Such a microphone 6c, which is described in more detail in the European patent document EP2338287B1, is a device that is able to convert an acoustic signal 12 into an electrical signal using interferometry-based technology. Such a microphone 6c in particular comprises a source of electromagnetic radiation, reflective elements such as mirrors, at least one detector for detecting this electromagnetic radiation and an interferometer such as a Fabry-Pérot interferometer or a Gires-Tournois etalon. It should be noted that in another alternative of this measuring device 1, the emitter module 6a to 6c can comprise any combination of the following microphones 6a to 6c: at least one pressure microphone 6a, at least one pressure-gradient microphone 6b and at least one optical microphone 6c.

As described hereinabove, the measuring device 1 further comprises a control unit 7 connected to the emitter and receiver modules 5, 6. This control unit is configured to evaluate the water vapour content of the gaseous fluid 11 contained inside said enclosure as a function of said at least one acoustic signal 12 received by the receiver module 6a to 6c. This control unit 7 can be a computer. It comprises hardware and software resources, in particular at least one processor cooperating with memory elements. This control unit 7 is capable of executing commands to implement a computer program in order to contribute to determining the measurement of the relative humidity level inside the enclosure 9 of the case 3 of the watch 2.

This control unit 7 is connected to the emitter and receiver modules 5, 6a, 6b, 6c. Under these conditions, it is able to control these modules 5, 6a, 6b, 6c, in order to contribute to estimating the measurement of the relative humidity level inside the enclosure 9 of the case 3, and is also able to determine values of acoustic signals 12 measured by the receiver module 6a to 6c. In particular, the control unit 7 is capable of implementing signal processing operations through signal modulation and synchronous detection operations. Such a control unit 7 comprises, for example in the memory elements thereof, one or more look-up tables for matching values of acoustic signals with values of water vapour contents of the gaseous fluid 11, in order to participate in evaluating the humidity level inside the case 3. It is understood that the control unit 7 is able to use a value of the water vapour content of the gaseous fluid 11 to determine the relative humidity level inside the enclosure 9 of the case 3.

It should be noted that the measuring device can comprise temperature sensors for measuring the temperature of the watch as well as the temperature of the environment in which said watch is located. These sensors are connected to the control unit 7 and participate in evaluating the humidity level inside the case 3. More specifically, this evaluation is in particular made when the temperature of the watch and that of its environment are substantially the same or strictly the same.

In this assembly 10, the watch is thus provided with the case 3. Such a case 3 includes a middle 14 which is, for example, annular in shape and which is provided with an upper annular edge on which a crystal 15 of this case 3 rests. This crystal 3, also referred to as a "glass", can be, in a non-limiting and non-exhaustive manner, a mineral glass or a sapphire glass with a thickness that is configured to at least allow the light beams to be transmitted from the emitter module.

In the case 3 of the watch 2 shown in the example in FIGS. 2 and 3, the configuration thereof is substantially circular. However, the invention is in no way limited to such a configuration of this case 3 of the watch 2.

In the measurement assembly 10, the receiver module 6a, 6b, when it comprises a pressure microphone 6a or a pressure-gradient microphone 6b, can be arranged opposite any of the different parts of the case 3, i.e. opposite the back 13, the middle 14 or the crystal 15. If this receiver module 6c comprises an optical microphone 6c, it is arranged facing the crystal 15 of the case 3.

It should be noted that according to one alternative, the receiver module 6c connected to the control unit can be capable of measuring the vibrations of the middle in order to participate in evaluating the relative humidity level inside the enclosure of the watch case. Moreover, the measuring device 1 can be a portable or mobile device, i.e. a device 1 that can be carried by a user without requiring a wired connection for its power supply.

On the other hand, the measuring device 1 can comprise a display element capable of displaying a plurality of different visual signals depending on the value of the relative humidity level determined by the control unit 7. Depending on the case, each visual signal displayed by the display element thus corresponds to a predetermined relative humidity level value or to a predetermined relative humidity differential value. This display element can be a screen provided with light-emitting diodes or can correspond more simply to light indicators with light-emitting diodes, the illumination of a given diode corresponding to a predetermined relative humidity threshold.

The invention claimed is:

1. A device for measuring a relative humidity level inside an enclosure of a case of a watch, the device comprising:
    an emitter module provided with a source of light radiation capable of emitting light beams towards the enclosure of said case;
    a receiver module for receiving at least one acoustic signal from said enclosure, and
    a control unit connected to said modules- and which is configured to evaluate a water vapour content of a gaseous fluid contained inside said enclosure as a function of said at least one acoustic signal received by the receiver module.

2. The measuring device according claim 1, wherein the emitter module comprises an element for modulating said source of light radiation configured such that said emitter module emits light beams capable of ensuring a generation of at least one acoustic signal by the gaseous fluid containing the water vapour contained in the enclosure of the case.

3. The measuring device according to claim 1, wherein the emitter module is configured to emit pulse light beams.

4. The measuring device according to claim 1, wherein the receiver module comprises at least one electroacoustic transducer.

5. The measuring device according to claim 1, wherein the receiver module comprises a pressure microphone or a pressure-gradient microphone.

6. The measuring device according to claim 1, wherein the receiver module comprises an optical microphone.

7. The measuring device according to claim 6, wherein the optical microphone comprises a source of electromagnetic radiation, reflective elements, at least one detector for detecting the electromagnetic radiation and an interferometer.

8. The measuring device according to claim 1, wherein the control unit comprises, in the memory elements thereof, one or more look-up tables for matching values of acoustic signals with values of water vapour contents of a gaseous fluid contained inside said enclosure.

9. The measuring device according to claim 1, wherein the source of light radiation is a laser source and the gaseous fluid is air containing water vapour.

10. An assembly for determining a relative humidity level inside a watch comprising said watch and thea measuring device according to claim 1.

* * * * *